6 Sheets—Sheet 1.

W. H. ABEL.

Knitting-Machine.

No. 8,779. Reissued July 1, 1879.

Witnesses.
J. S. Brown.
Fred G. Dieterich

Inventor,
Wm. H. Abel.

W. H. ABEL.
Knitting-Machine.

No. 8,779. Reissued July 1, 1879.

Witnesses,
J. S. Brown,
Fred. G. Dieterich

Inventor,
Wm. H. Abel

6 Sheets—Sheet 3.

W. H. ABEL.

Knitting-Machine.

No. 8,779. Reissued July 1, 1879.

Witnesses,

L. S. Brown,

Fred. G. Dieterich

Inventor,

Wm H. Abel

W. H. ABEL.
Knitting-Machine.

No. 8,779. Reissued July 1, 1879.

Witnesses,
J. S. Brown,
Fred. G. Dieterich

Inventor,
Wm. H. Abel

W. H. ABEL.
Knitting-Machine.
No. 8,779. Reissued July 1, 1879.
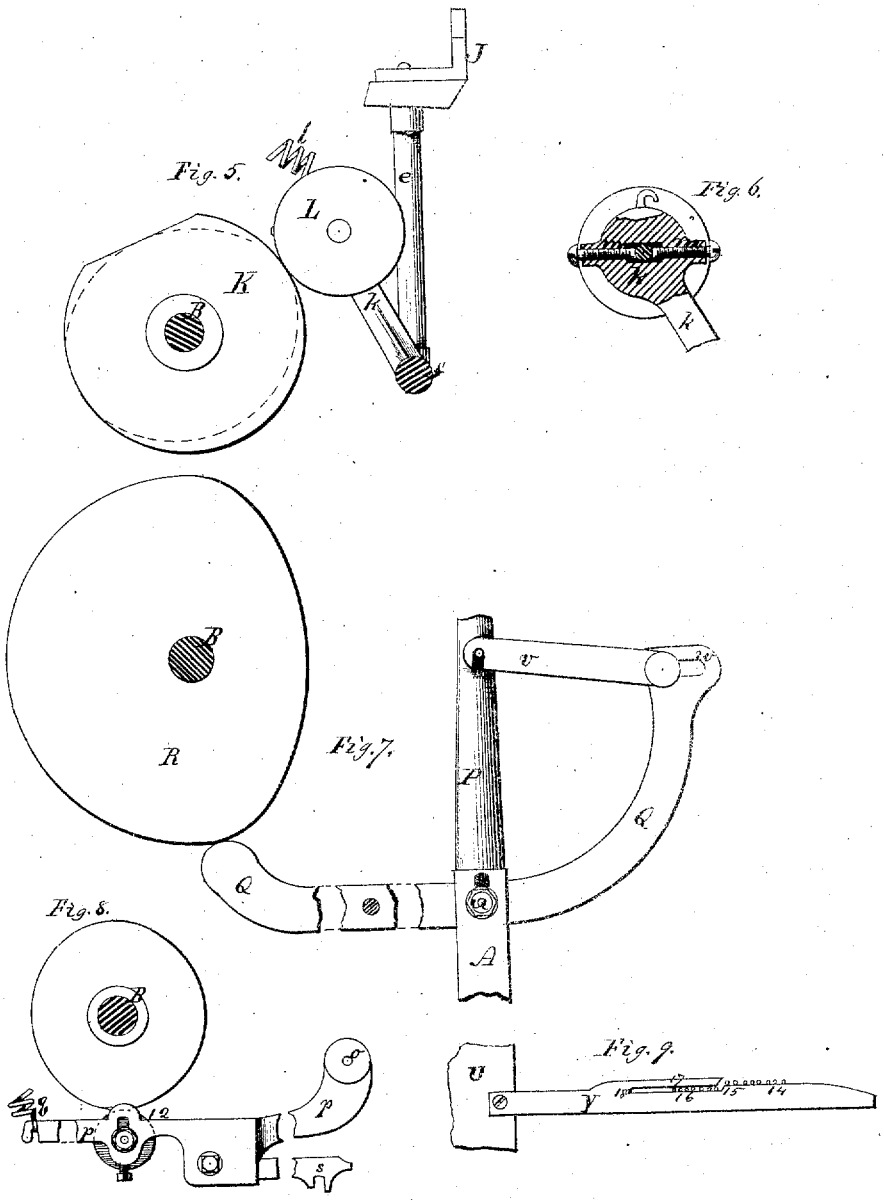
Witnesses:
J. S. Brown.
Fred. G. Dieterich
Inventor,
Wm. H. Abel

W. H. ABEL.
Knitting-Machine.

No. 8,779. Reissued July 1, 1879.

Witnesses
Fred. G. Dieterich
H. W. Boardman

Inventor
Wm. H. Abel.

UNITED STATES PATENT OFFICE.

WILLIAM H. ABEL, OF BRIDGEWATER, NEW HAMPSHIRE.

IMPROVEMENT IN KNITTING-MACHINES.

Specification forming part of Letters Patent No. 187,696, dated February 27, 1877; Reissue No. 8,779, dated July 1, 1879; application filed December 3, 1878.

*To all whom it may concern:*

Be it known that I, WILLIAM H. ABEL, of Bridgewater, Grafton county, and State of New Hampshire, formerly of Laconia, in said State, have invented a new and Improved Self-Acting Narrowing Knitting-Machine; and I do hereby declare that the following is a full and exact description thereof, reference being had to the accompanying drawings, making part of this specification—

Figure 1:
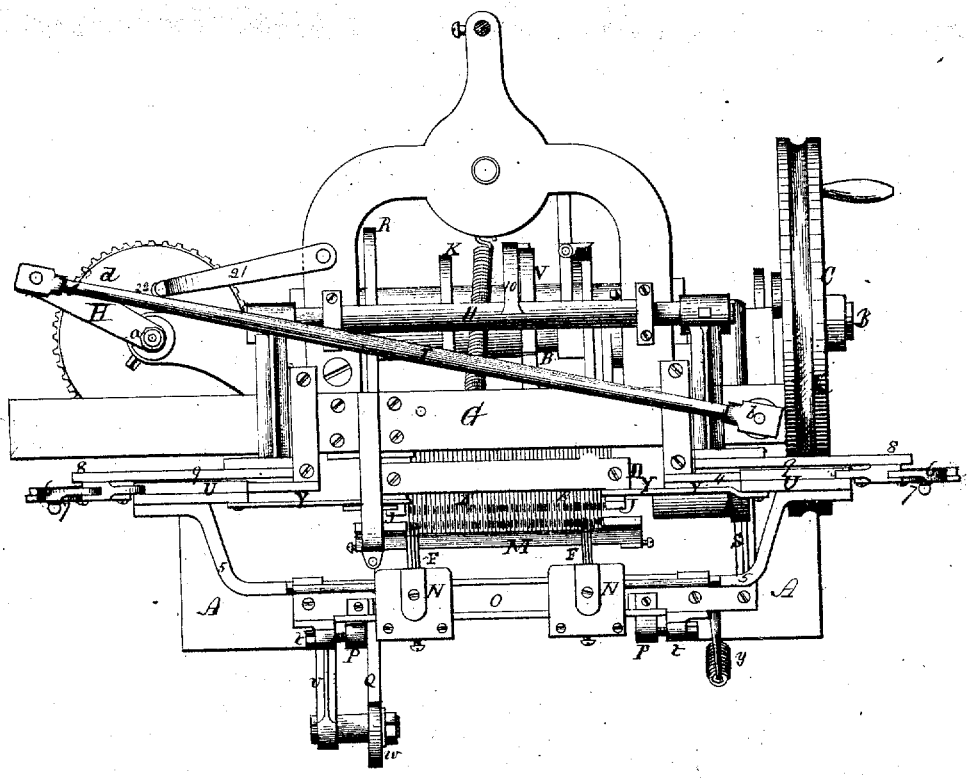
Figure 2:
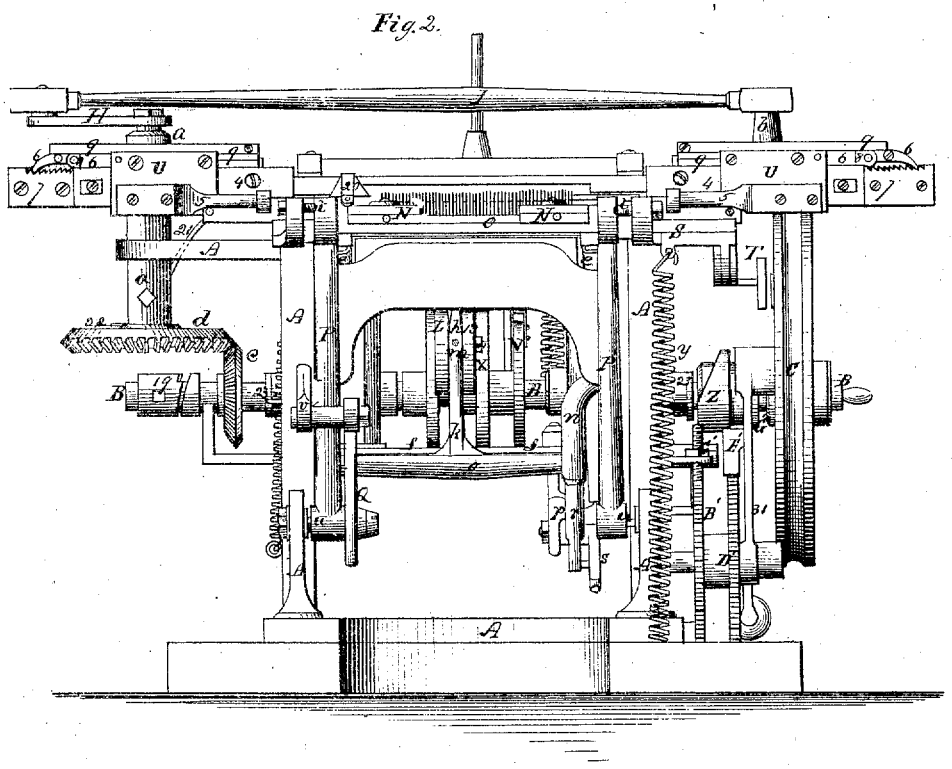
Figure 3:
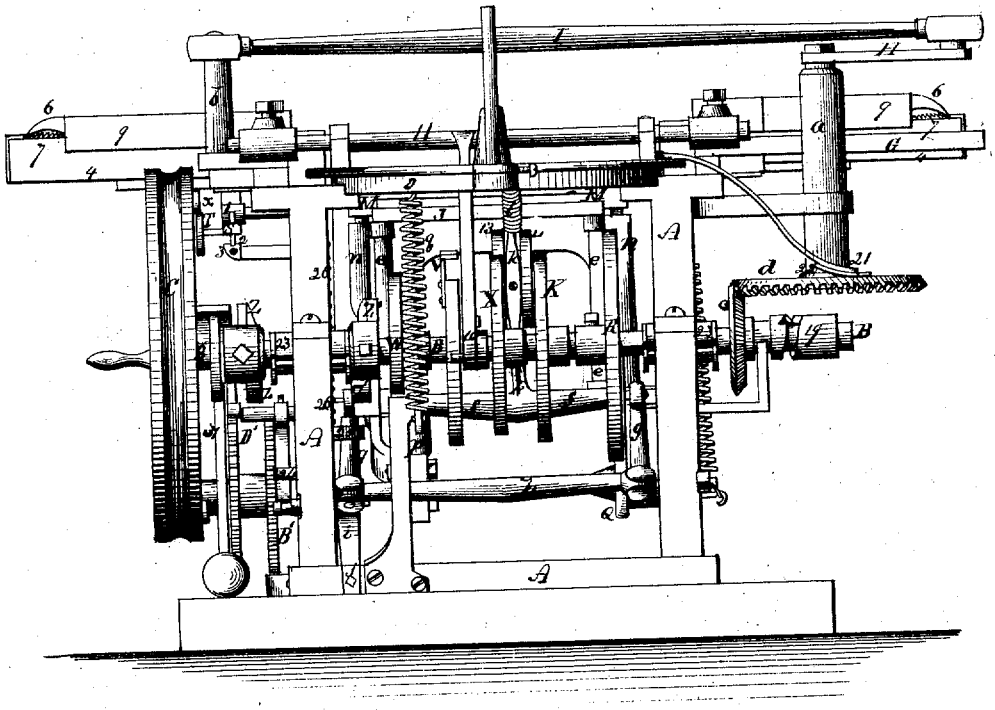
Figure 4:
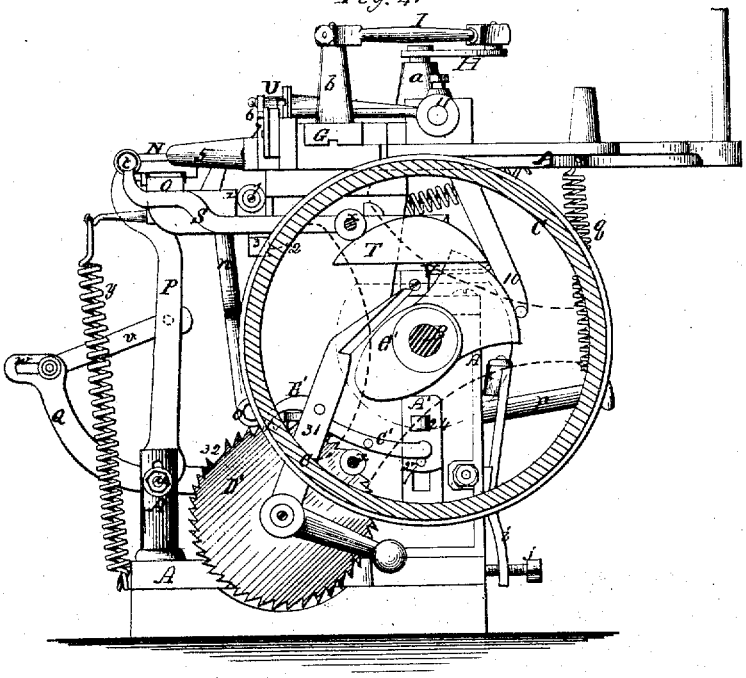
Figure 10:
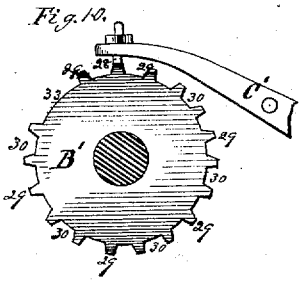
Figure 11:
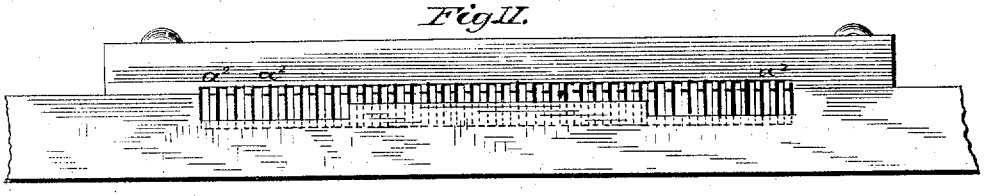
Figure 12:
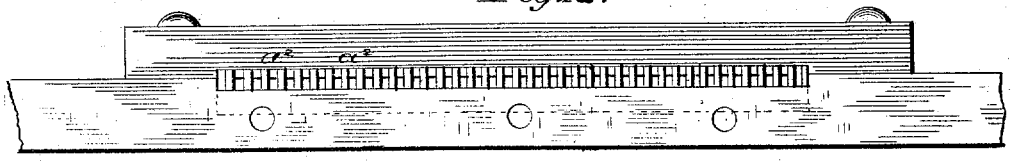
Figure 16:
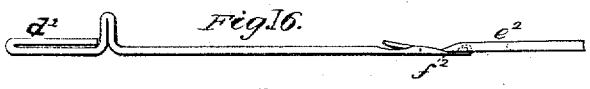
Figure 18:
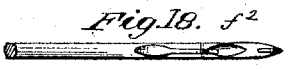
Figure 17:
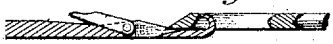
Figure 13:
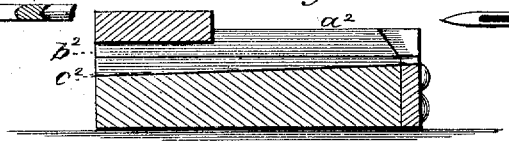
Figure 19:
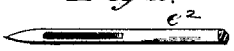
Figure 14:
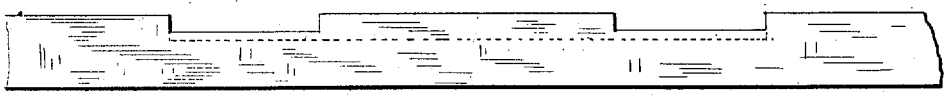
Figure 15:
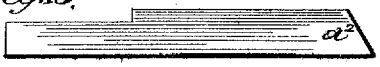

Figure 1 being a top view of the machine; Fig. 2, a front view of the same; Fig. 3, a rear view thereof; Fig. 4, an end view of the same, the driving-pulley being in section; Figs. 5, 6, 7, 8, 9, and 10, views of parts detached. Fig. 11 represents a front view of the needle-bar, showing the fillets $a^2$ $a^2$; Fig. 12, a back view of said bar; Fig. 13, a transverse section of said bar, the plane or bed surface for the operative knitting-needles being shown by the line $b^2$, and the plane for depressed needles, after the stitche are taken off, by the line $c^2$. Fig. 14 shows a front view of the plate, ready for cutting the grooves for the fillets. Fig. 15 shows a separate fillet or rib. Fig. 16 shows a latch-needle, with the regulating bar or tail $d^2$ and a transferring-point over the hook and in the flaring slot $f^2$. Fig. 17 shows a longitudinal section of the needle and transferring-point, with the hook of the needle shown in the slot in the transferring-point and the transferring-point in the flaring slot of the needle. Fig. 18 is a top view of the needle, showing the flaring slot $f^2$. Fig. 19 shows the top side of the transferring-point, with the slot for the reception of the hook extending through the point.

Like letters designate corresponding parts in all of the figures.

The purpose of my invention is to produce an improved self-acting narrowing knitting-machine for making shaped goods whereby the machine itself may be greatly simplified and cheapened; whereby the knitting can be done much more rapidly than with the spring-needle narrowing-machines heretofore generally used; whereon almost any quality of yarn may be employed in knitting, and whereby the skilled labor required with other narrowing-machines may be rendered unnecessary.

The nature of my invention consists in a latch-needle knitting-machine, with which is combined an improved self-acting narrowing-machine, the construction and arrangement of which and the method of combining the machine are hereinafter specified.

In the drawings, A represents the frame of the machine, of any suitable construction; B, the driving-shaft, extending across the machine from end to end, and receiving most of the actuating parts of the machine; C, the driving-pulley on the driving-shaft; D, the needle-bar, receiving any required number of latch-needles, E E; and G, the sliding bar, bearing the cam which operates the needles, and having a longitudinal reciprocating movement over and a little back of the needle-bar.

The reciprocating movement of the sliding cam-bar G is effected by means of a revolving crank, H, mounted on a vertical shaft, *a*, near one end of the machine, and a connecting-rod, I, extending from the crank-pin to a pivot, *b*, on the sliding cam-bar, near the other end of the machine, so that as great a length may be given to the connecting-rod as practicable.

The crank H is driven by two bevel-gears, *c d'*, respectively, on the driving-shaft B and on the crank-shaft, the former being just half as large as the latter, whereby a reciprocating movement in either direction is given to the sliding cam-bar at each revolution of the driving-shaft, and the motions of all the operative parts of the machine are properly timed.

The back sinker-bar J is mounted on two standards, *e e*, on the rock-shaft *f*, which is pivoted to the front end of arms *g g*, reaching back and attached to an adjusting rock-shaft, *h*, at the rear side of the machine, and provided with an adjusting-arm, *i*, and screw *j*, as shown in Figs. 3 and 4, whereby the sinkers are raised and lowered. The ordinary forward-and-backward movement of this sinker-bar is produced by means of a cam, K, Figs. 3 and 5, on the driving-shaft operating against an anti-friction wheel, L, on an arm, *k*, of the rock-shaft *f*.

The cam is perfectly circular and concentric with its shaft, excepting one depression in its edge, to allow the sinker-bar to move backward at the proper time by the action of counter-spring, *b*. At all other times the sinker-bar is held by the circular part of the cam steadily and constantly to the work.

The sinker-bar is adjusted to make closer or looser stitches by means of two counter adjusting-screws, *m m*, acting against the laterally-movable pivot of the anti-friction wheel L, there being a laterally-extending slot in the arm *k* to allow the position of said anti-friction wheel to be varied on the arm. This is a simple and convenient means of adjustment, and capable of great accuracy.

The front sinker-bar, M, also is mounted on two standard-arms, *n n*, which are attached to a rock-shaft, *o*, turning in suitable bearings on the frame, from which rock-shaft a suitable arm, *p*, extends backward, a spring, *q*, extending from the rear end of the said arm to a stationary part of the machine, to hold the sinker-bar in the right position in front of the work, the device being adjustable by a set-screw, against which the arm bears. Since the only function of the front sinkers in ordinary knitting is to hold the work to the back sinkers and allow the needles to perform their office without displacing their loops, no operative movement of the front sinker-bar is required in the knitting organization of the machine.

For convenience in putting on the work with the hook-bar for taking up stitches and repairing the work, the front sinker-bar is provided with a means of swinging it forward out of the way, consisting of a downwardly-projecting arm, *r*, on the rock-shaft *o*, and a hook-catch, *s*, pivoted to the arm *p*, and catching on a pin on the said arm *r* to couple the rock-shaft rigidly thereto, and thereby cause the same to move with the arm *p*; but on detaching the catch *s* from its pin the rock-shaft is left free to turn and allow the front sinker-bar to be moved forward away from the work.

The mechanism and movements thus far described belong to the latch-needle knitting-machine proper; but all the parts are adapted to receive the narrowing mechanism and its adjuncts, so that the movements of the two organizations are in perfect harmony.

The narrowing-machine proper, consisting of the covering or transferring points F F, their sliding blocks N N, and rocking bar O, on which the said blocks slide and are moved to and from the work, is mounted on a swinging frame, P, to which the bar O is pivoted at *t t*, and the said frame is pivoted at *u u* to a suitable part of the main frame.

A cam-arm, Q, is secured to the frame P by pivoting at one end of the pivots *u u*, and by a notched catch, *v*, pivoted to a forward projection of the arm and catching over a pin on the frame P, so that the narrowing-machine may be uncoupled from and coupled to its cam-lever at will.

The attachment of the pivot of the catch *v* is adjustable in a slot, *w*, of the arm Q, whereby the position of the parts and limits of the movements of the narrowing-machine may be adjusted and determined.

The reciprocating backward-and-forward movement of the narrowing part of the machine is effected by a cam, R, on the driving-shaft B acting on the rear end of the arm Q.

The needles are similar to the ordinary latch-needle, and possess all its properties, added to which is the flaring slot between the latch and the hook for the reception of the transferring-points and the regulating-bar or tail-piece attached to the shank or rear end of the needles.

The covering or transferring points have a slot cut in their under sides for the reception of the hooks of the needles, and their points are tapered to enter the slots in the needles. Neither the needles having a slot between their hooks and latch-pivots to receive the transferring-points nor the transferring-points having a slot in the under sides to receive the hooks of the needles do I claim separately or in combination in this application, as the same have been made the subject-matter of a separate application for Letters Patent filed by me in the United States Patent Office March 22, 1877, and require no further description here.

The up-and-down movements of the covering or transferring points to cover and uncover the latch-needles after being brought over the said needles, as indicated in Fig. 1, are produced by rocking the bar O on its pivots *t t*. From the said bar an arm, S, extends backward, and bears a stationary cam, T, which lies within reach of the driving-pulley C, and on the inside of this pulley are pivoted two anti-friction rollers, *x x*. (Shown in position in Fig. 4.) As the driving-pulley revolves these rollers ride over the cam T and depress the arm S, thereby bringing the covering or tranferring points down upon the needles, first, to take off the loops from their needles, and, second, to deliver them to the next needles; and as soon as the rollers pass from the cam a counter-spring, *y*, operates to raise the arm, and, by consequence, the covering or transferring points.

It is essential that the transferring-points, when brought over the needles, should be held securely in exact position without the possibility of getting out of place during the narrowing movements. I provide locks which effect this very perfectly, one of which locking-engagements is effected by the cam-arm of the transferring-points frame, being held firmly in place by its cam during the narrowing. The other lock at the other side of the machine is constructed as follows: Upon the top of the arm S is formed or attached a stop, *z*, abutting at the rear against an anti-friction roller or equivalent stop, 1, on the frame A when the covering or transferring points are brought into position over the needles, as shown in Fig. 4. Then, as the arm S is lowered by action upon its cam T, another stop, 2, on the under side of said arm, facing forward, moves downward close behind or in contact with the fixed projection 3 of the frame. Thus, when the covering or transferring points go down upon the needles there is no possibility of their moving either forward or backward.

The lateral movements of the covering or transferring points to take the stitches or loops from their needles and transfer them to the next inner needles for narrowing are effected by the following means: Blocks or carriages U U are arranged to slide on fixed ways 4 4. On these blocks, respectively, are secured arms 5 5, which reach to the outer edges of the sliding blocks N N, which bear the covering or transferring points. Also, to the outer ends of the blocks U U are, respectively, pivoted jointed pawls 6 6, which take into fixed ratchet-bars 7 7, secured to the said ways or to the frame of the machine. The notches in these ratchet-bars are just as far apart as the needles from center to center, so as to produce an exact and uniform movement of the covering-point slide-blocks, whereby, at each time when the pawls 6 6 are shifted from one notch to the next inner notch of these ratchet-bars, the covering or transferring points are moved precisely from one needle to the next inner needle in order. The pivot-pins 8 8, by which the two parts of the pawls, respectively, are pivoted together, project backward into horizontal grooves of lifters 9 9, located just back of and parallel with the ways 4 4. The said grooves allow these pivot-points to slide freely, and by raising the lifters at the proper moments to a certain extent the pawls are thereby lifted at their joints, and shortened sufficiently to draw their points from their notches in the notch-bars into the next inner notches thereof. Then, on again depressing the lifters, so as again to straighten the pawls, the rack-blocks U U, and consequently the blocks N N, carrying the covering or transferring points, are moved inward a distance equal to the distance between two adjacent needles, as required.

The lifters 9 9 are actuated by a hook-cam, V, Fig. 4, on the driving-shaft B, catching around a projection on the lower end of a downwardly-extending arm, 10, on a rock-shaft, 11, which is pivoted in a suitable position, as shown, to the frame of the machine, and bears the two lifters or projecting arms secured to it. The cam vibrates the rock-shaft at the proper time just sufficiently to raise the lifters to the extent desired. The edge of the cam then strikes the arm 10 and brings the lifters down into place again.

The movements of the front and back sinker-bars, in connection with the covering or transferring points in narrowing, are peculiar.

When the covering or transferring points are moved backward over the needles for narrowing the front and back sinker-bars both move backward, carrying the sinkers between the needles, the front sinkers for sliding the loops back upon the needles beyond the pivots of the latches to move and hold the latches away from the covering or transferring points, and to give room for the said covering or transferring points to come down upon the needles in front of the loops, and the back sinkers to give way for the work and to fit into position for its next forward functional movement. Then, as soon as the covering or transferring points are brought down upon the needles, both sinker-bars move forward for the back sinkers to push the loops upon the covering or transferring points, and for the front sinkers to give way for the work to get into position again. Next, the back sinker-bar recedes a little to allow the covering or transferring points to raise the loops, and then immediately comes forward again to push the loops farther upon the covering or transferring points to insure their retention thereon and certain delivery to the adjacent needles. The back sinker-bar then moves backward to allow the covering points to move laterally and carry the loops to the next inner needles. Then the front sinker-bar moves backward to push the loops from the covering or transferring points back upon the needles beneath. Finally, both sinker-bars come forward into position for knitting, and at the same time the covering or transferring points move forward to be out of the way, while the knitting proceeds till it is time to commence the next narrowing. All these movements are determined automatically by the machine itself.

To effect these movements of the front and back sinker-bars cams on the driving-shaft B are employed.

A cam, W, acting upon an anti-friction wheel, 12, on the arm *p*, effects the movements of the front sinker-bar, as described, there being two operating projections on the cam to move the sinker-bar backward twice in the revolution of the driving-shaft.

A cam, X, acting upon an anti-friction wheel, 13, on the arm *k*, effects the movements of the back sinker-bar. This cam also acts twice to move the sinker-bar forward at each revolution of the driving-shaft, and it also has a depression in one throwing projection of its periphery, to effect the slight receding movement of the sinker-bar to allow the covering or transferring points to lift the loops before fully pushing the loops thereon, as above described. This cam X is entirely distinct from the cam K, which controls the movements of the back sinker-bar in knitting, and the anti-friction wheel 13, against which the cam X acts, is entirely distinct from the anti-friction wheel L, against which the cam K operates, but it is on the same pivot as that and adjusted by the same means.

In narrowing, as fast as the loops are taken from the outermost needles, the said needles are required to be moved from their position to a sufficient distance not to take the yarn again as the yarn-carrier passes over the needles in knitting.

To effect this purpose, the said needles are caused to drop down into a position a little lower than the plane of the needles for knitting. To admit of this the needle-bar is constructed as follows: The means of effecting the dropping movement consists of slides Y Y, attached to the rack-blocks U U, and reaching inward therefrom to the needles, and having the following construction: A portion, 14, at the inner end of each slide, has its upper edge just high enough to hold the needles, which rest thereon at the proper height for knitting, the slides being the sole support for the front ends of these needles, which are subject to depression from their usual height in narrowing. At the outer extremity of this portion of the slide there is a downward inclination, 15, to a portion, 16, of the slide, which holds the needles at a height far enough below the needles on the part 14 to be out of the way in knitting, as desired. Over the part 16 is a projecting arm or part, 17, of the slide, which forms a slot, 18. The entire length of the said part 14 is just wide enough for the needles to move freely in, and be prevented from lifting out of position, as shown clearly in Fig. 9. The inclination 15 is such as to act as a cam to raise the needles out of the groove or slot 18 upon the raised part 14 when the slide recedes from under the needles after each narrowing; and the inclination of the inner end of the projection 17 is nearly parallel with the inclination 15, so as to act in connection with the weight of the needles to cause them to descend into the slot without failure in narrowing. The position of the inclination 15 is such that as the slide moves inward correspondingly with the movement of the covering or transferring points sliding blocks N N, driven inward by the projecting arms 5 5 of the rack-blocks U U, and, as the loops are taken one by one successively from the needles in narrowing, each needle, as soon as the loop is taken from it, drops down into the slot 18, out of the way; and when the slides Y Y are drawn outward, after the narrowing is completed, all the needles which had dropped one by one into each slot 18 are thereby again brought out upon the raised part 14 of the slides, ready for knitting the full width again, or for another narrowing. The operations of the two organizations, the knitting-machine part and the narrowing-machine part above described, are distinct and alternate with each other. It remains to describe the means by which this alternation of the two sets of operations is effected.

Upon the driving-shaft B, the cam K, which controls the back sinker-bar while knitting, and the bevel gear-wheel *c*, which operates the sliding-needle cam-bar G through the crank H and connecting-rod I, belong to the knitting organization, and the hook-cam V, which causes the movement of the rack-blocks U U, and the cams W X, which, respectively, operate the front and back sinker-bars simultaneously, or in harmony together, belong to the narrowing organization.

The cams are so located on the driving-shaft that by moving the said shaft lengthwise a distance somewhat more than the thickness of the cams, one way or the other, either the cam K is brought into action or the cams V W X, as the case may be; also, when the driving-shaft is moved to throw the cams V W X into action for narrowing, the bevel-wheel *c*, which drives the needle cam-bar, is uncoupled from the said shaft, since the said cam-bar must be at rest while narrowing. This uncoupling is effected by having a clutch, 19, secured fixedly to the driving-shaft, arranged to separate from its counterpart on the said bevel-wheel when the shaft is moved endwise to bring the narrowing mechanism into action. Then, when the driving-shaft is moved in the other direction, to throw the narrowing mechanism out of action, the said clutch engages with the bevel-wheel *c* again and brings the cam-bar into action.

An important point in this movement is that the cam-bar G which bears the yarn-carrier 20, must be at the extremity of its movements, or nearly so, when the uncoupling of the bevel-wheel *c* takes place and the movements of the said cam-bar are suspended for narrowing; otherwise the yarn-carrier would be left over the needles, and the narrowing could not proceed. This proper stopping of the cam-bar is very easily and naturally effected by arranging the clutch 19 so that it becomes completely detached from its counter-clutch on the bevel-wheel *c* only at the very extreme of the sliding movement of the driving-shaft in that direction; but, should the bevel-wheel *c* be turned to any considerable extent from its position when uncoupled during the time of its being uncoupled, disarrangement of the machine would take place, and the wheel would not become automatically coupled again.

To obviate the liability of this happening, I employ a spring, 21, secured to the frame A, and bearing slightly on the top of the bevel-wheel *d*, which gears into said bevel-wheel *c*, thus acting as a brake to keep the said bevel-wheel in position. The pressure of this spring-brake is not sufficient to practically impede the motions of the parts when in action. A pad, 22, may be applied to the foot of the spring to prevent unnecessary rubbing and friction on the bevel-wheel *d*.

To enable the driving-shaft B to have the sliding movement necessary for bringing the two organizations alternately into action, it is preferable to mount it in bearings 23 23, which themselves have a sliding movement of the requisite extent in the frame of the machine, these bearings being V-shaped at the bottom to slide in corresponding V-shaped ways, which always wear centrally and keep the bearings always accurately fitted therein. The sliding movement of the driving-shaft is effected by two cams, Z Z′, secured thereto, one at one side and the other at the other side of one of the uprights of the frame A. These cams act respectively against two projections, 24 and 25, on a shifting block, A′, which has an up-and-down sliding movement in the said standard of the frame. When the cam Z strikes the projection 24 of the shifting block, the latter being stationary, the cam itself must move, and with it the driving-shaft, the movement produced thereby being as much as the distance the said shaft is required to move endwise; and when the cam Z′ strikes the projection 25 the cam itself, and the driving-shaft with it, for a similar reason, are moved in the other direction to the extent required. The projections 24 and 25 are at different heights, so that when the shifting block is raised to its highest position the projection 24 is brought opposite to the cam Z, and causes the said cam to throw the driving-shaft farthest toward the end of the machine when the cam is located in position for knitting, and keep the shaft there while the knitting continues, the projection 25, during the time, being entirely above and out of contact with the cam Z′; and when the shifting block is moved to the extremity of its downward position the projection 24 is brought below and out of contact with its cam Z, and the projection 25 is brought opposite to the cam Z′ which then and thereby is made to throw the driving-shaft endwise in the other direction, thus bringing the narrowing mechanism into action. A simple spring, 26, serves to raise and to hold raised the shifting block. The depression of the shifting block to bring the narrowing mechanism into action is effected by the following device: A pattern-wheel, B′, Fig. 10, is mounted on the frame A in front of the shifting block, and a connecting-lever, C′, is pivoted to the frame between the two. One end of the lever plays between two projections, one of which may be the projection 24, and a projection, 27, below, bearing and operating on the latter. The other end of the lever has an adjustable cam-point, 28, which bears upon the edge of the pattern-wheel, so that the lever may be acted on thereby. The pattern-wheel has cam-projections 29 29, each sufficient to raise the forward end of the lever, and consequently depress the shifting block to its lowest position, while the spaces 30 30 between these cam-projections are deep enough to receive the cam-point on the lever and permit the lowering thereof, so as to allow the shifting block to be raised to its highest position by the spring 26. The distances between the cam-projections 29 are to be according to the form of narrowing required. If the narrowing is to be uniform the distances are uniform. If the narrowing is to be irregular the distances are irregular.

The revolving motion of the pattern-wheel is regular, being produced, as shown in the drawings, by a ratchet-wheel, D′, secured to the shaft of the same, into the teeth of which works a pawl, E′, pivoted to an arm, 31, that vibrates on the shaft of or on a pivot concentric with the pattern-wheel and ratchet-wheel. Against the upper end of the pawl-lever a cam, G′, on the driving-shaft acts to cause the same to vibrate forward and backward once at each revolution thereof, and consequently to move the ratchet-wheel one notch. The notches in the ratchet-wheel correspond in position with the cam-projections on the pattern-wheel.

Thus, as shown in the drawings, which represent a pattern-wheel for narrowing the toes of stockings, having its cam-projections at uniform distances apart, there are three notches in the ratchet-wheel for each cam-projection on the pattern-wheel, one notch opposite to each projection, and two notches opposite to each space between the projections; and since when the cam-point of the lever C′ is down in these spaces the shifting-block is raised to its highest position, and the driving-shaft is thereby brought into position for knitting, and when a cam-point is on a cam-projection of the pattern-wheel the shifting block is thereby brought to its lowest position, and the driving-shaft is thrown into position for narrowing, the effect of the construction of pattern-wheel described is to knit two courses and then narrow one stitch alternately. It is obvious the pattern-wheel may be constructed to produce any form of narrowing and shaped work within practicable limits. When long portions of straight work intervene between the narrowings, the pattern-wheel may be thrown into and out of action by hand; but the entire operation is easily effected, automatically and continuously, for knitting shirts, drawers, or any kind of articles.

To accomplish this a Jacquard mechanism is combined with or takes the place of the pattern-wheel, the simplest way of constructing which is to form the cam-projections for operating the shifting block on Jacquard links, which travel on a simple sprocket-wheel in place of the pattern-wheel, and turn by the same means. When no narrowing is to take place the cam-projections on the Jacquard links are, of course, omitted.

The narrowing-movement is stopped automatically by simply having one tooth omitted on the ratchet-wheel, as at 32, there being a space, 33, of greater extent than the other spaces between the cam-projections opposite to the said space when the ratchet-tooth is omitted, it being understood that a course of narrowing is completed in one revolution of the ratchet-wheel. The narrowing mechanism is again brought into action, at the will of the operator, by simply moving the ratchet-wheel the distance of one or two notches by hand, so as to engage the pawl with a tooth thereof.

Having thus described my invention, I claim—

1. The needle-bar having flat and inclined or depressed surfaces, in combination with independently-constructed fillets attached thereto, as set forth.

2. The needle-bar having flat and inclined or depressed surfaces, in combination with the latch-needles having flaring slots therein between the hooks and latch-pivots for the reception of the transferring-points, substantially as shown and described.

3. The transferring-points and latch-needles slotted between their hooks and latch-pivots for their reception, combined with the needle-bar having flat and depressed surfaces, substantially as specified.

4. The slides Y Y in combination with the latch-needles, slotted as aforesaid, and the needle-bar of flat and inclined or depressed surfaces.

5. The slides Y Y, and needles E E, when constructed as aforesaid, combined with the needle-bar of flat and inclined or depressed surfaces and the transferring-points.

6. The transferring-points with their carrying-frame, its lever, and their actuating and locking-cam, combined with the latch-needles having flaring slots between their hooks and latch-pivots for the reception of said points, substantially as indicated.

7. The transferring-points and their carrying-frame, in combination with their locking device, consisting of the arm S, stop *z*, stop-roll 1, and stop 2, substantially as shown and described.

8. In a knitting-machine, the front sinker-bar, M, constructed and arranged as and for the purposes indicated.

9. The combination, with a series of knitting-needles, of the front sinker-bar, M, and the back sinker-bar, J.

10. The combination of the sinker-bars M and J with the needles and transferring-points.

11. The front sinker-bar, M, in combination with its actuating-lever, cam, and spring for imparting the forward and backward movements thereto, as and for the purposes shown and stated.

12. The transferring-points and their carrying-bar, arranged as described, in combination with its cam, lever, and spring for depressing and raising said points, substantially as stated and shown.

13. The jointed pawls, in combination with their rack-bars, the transferring-points, and slides Y Y.

14. The combination, with the reciprocating cam-shaft and its cams, constructed and arranged substantially as described, of the sinker-bars M and J, the transferring-points, and the latch-needles slotted, as shown and described.

15. The sliding bearings 22 and 23, in combination with the shaft D and frame of the machine, for the purposes shown and described.

16. In combination with a narrowing mechanism and self-acting pattern mechanism controlling the movements thereof, the reciprocating needle-operating cam-bar G, arranged to be stopped at the proper place before the narrowing mechanism is brought into action, substantially as and for the purposes specified.

WM. H. ABEL.

Witnesses:
J. S. BROWN,
S. A. TERRY.